United States Patent
Krauss

(10) Patent No.: US 7,992,146 B2
(45) Date of Patent: Aug. 2, 2011

(54) METHOD FOR DETECTING RACE CONDITIONS INVOLVING HEAP MEMORY ACCESS

(75) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1288 days.

(21) Appl. No.: 11/562,830

(22) Filed: Nov. 22, 2006

(65) Prior Publication Data

US 2008/0120627 A1 May 22, 2008

(51) Int. Cl.
*G06F 9/46* (2006.01)
*G06F 9/44* (2006.01)
*G06F 13/00* (2006.01)
*G06F 11/00* (2006.01)

(52) U.S. Cl. ........ 718/100; 718/102; 718/107; 719/328; 711/100; 711/150; 711/151; 711/152; 704/798

(58) Field of Classification Search .................. None
See application file for complete search history.

(56) References Cited

U.S. PATENT DOCUMENTS

| 5,694,604 | A | 12/1997 | Reiffin |
| 6,314,471 | B1 | 11/2001 | Alverson et al. |
| 6,405,326 | B1 | 6/2002 | Azagury et al. |
| 6,593,940 | B1 | 7/2003 | Petersen et al. |
| 6,728,960 | B1 | 4/2004 | Loomans |
| 6,754,701 | B1 | 6/2004 | Kessner |
| 6,817,009 | B2 | 11/2004 | Flanagan et al. |
| 7,716,645 | B2 * | 5/2010 | Dolby et al. ............ 717/126 |

FOREIGN PATENT DOCUMENTS

| EP | 1202172 | 5/2002 |
| JP | 2004252670 | 9/2004 |

* cited by examiner

*Primary Examiner* — Qing Wu
(74) *Attorney, Agent, or Firm* — Cantor Colburn LLP; Daniel McLoughlin

(57) ABSTRACT

A method for detecting race conditions involving heap memory access including a plurality of threads being tracked. At runtime a plurality of APIs utilized to create and destroy thread synchronization objects are intercepted, and each synchronization object created via the APIs is tracked. A bit field is created that contains a unique bit for each synchronization object. Heap memory allocations and deallocations are intercepted and tracked. The heap memory access is intercepted, and at that time, the ID of the accessing thread is compared with the last thread ID associated with that memory block when it was last accessed. If the thread IDs do not match, then the current thread synchronization object bit field is compared with the last synchronization object bit field associated with thread memory block. Provided the bit fields are different, a race condition warning is reported that is displayable to the user having the call chains.

15 Claims, 5 Drawing Sheets

METHOD FOR DETECTING RACE CONDITIONS INVOLVING HEAP MEMORY ACCESS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of Invention

This invention relates in general to computer application programs, and more particularly, to race conditions in multi-threaded computer application programs.

2. Description of Background

The most common and troublesome race conditions in multithreaded applications typically involve objects in heap memory. Most other types of data are less subject to race conditions than heap memory; for example, stacks are generally thread-specific, data sections of loaded modules are read-only, and memory mapped data is typically shared with other processes and thus requires process level synchronization more commonly than thread level synchronization.

The problems associated with heap memory are applicable to various platforms including Windows, Unix and other operating systems, as well as C++, Java and other programming languages.

Thus, there is a need for a low-overhead method that detects and reports race conditions involving heap memory access.

SUMMARY OF THE INVENTION

The shortcomings of the prior art are overcome and additional advantages are provided through the provision of a method for detecting race conditions involving heap memory access. The method includes tracking a plurality of threads as the plurality of threads are created and terminated. The method further includes intercepting a plurality of application programming interfaces (APIs) utilized to create and destroy thread synchronization objects. The method further includes tracking each synchronization object that is created via the APIs. The method further includes intercepting the thread synchronization APIs. The method further includes creating a bit field that contains a unique bit for each synchronization object that is at least one of, (i) used, and (ii) has been used. The method further includes intercepting and tracking heap memory allocations and deallocations. Subsequently, the method proceeds by intercepting heap memory access. The method further includes comparing the ID of the accessing thread with the last thread ID associated with that memory block when the last thread was last accessed occurs provided at least one of the following occurs, (i) the thread IDs do not match, (ii) if the block is presently being written, and (iii) if at the last access time the block was written. Afterwards, the method includes comparing the current thread synchronization object bit field with the last synchronization object bit field associated with that memory block provided the bit-fields are different. Next, the method includes recording the current thread call chain if there are no bits in common. The method concludes by reporting a race condition warning that is displayable to the user having the call chains associated with the current and previous accesses to the memory block.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically we have achieved a low-overhead solution for a method for detecting race conditions involving heap memory access.

BRIEF DESCRIPTION OF THE DRAWINGS

The subject regarded as the invention is particularly pointed out and distinctly claimed in the claims at the conclusion of the specification. The foregoing and other objects, features, and advantages of the invention are apparent from the following detailed description taken in conjunction with the accompanying drawing in which:

The detailed description explains an exemplary embodiment of the invention, together with advantages and features, by way of example with reference to the drawings.

DETAILED DESCRIPTION OF THE INVENTION

Disclosed is a method of detecting race conditions in multithreaded application programs. The method may be implemented as part of a runtime analysis tool in which the application program is instrumented and profiled. The method may also be embodied as a standalone tool. The method yields a warning message as an output to the user whenever two threads contend for access to heap memory.

The disclosed method is intended to provide race condition detection in a tool that has minimal overhead, is easy to use and applicable to a majority of users. In order to meet these thresholds, assumptions regarding how threads access memory are made. One assumption is that a given thread will generally update a heap memory object as a complete object, and more particularly, an allocated block is not usually broken down into parts that are modified individually by different threads. Another assumption is that application programmers tend to minimize the number of thread synchronization objects than an application will use at any one time. As such, a memory block may be associated with a set of synchronization objects in a relatively small amount of space, as compared with the space required to associate the set of synchronization objects with some other less limited set of objects. Another assumption is that sequential access to a memory block, before and after a memory write, is the most relevant subject when analyzing race conditions at runtime. If a first thread writes to a block, and then a second thread reads from it, this is a more interesting situation to analyze than what happens when a third thread reads from that same block some time later.

The disclosed method may be applied to other types of memory besides heap memory when the operating system provides a means of determining the locations and extents of the relevant ranges of memory, to which the method is to be applied. For example, a mechanism for performing the method in conjunction with the Windows® operating system is described in further detail herein.

Figure 1:
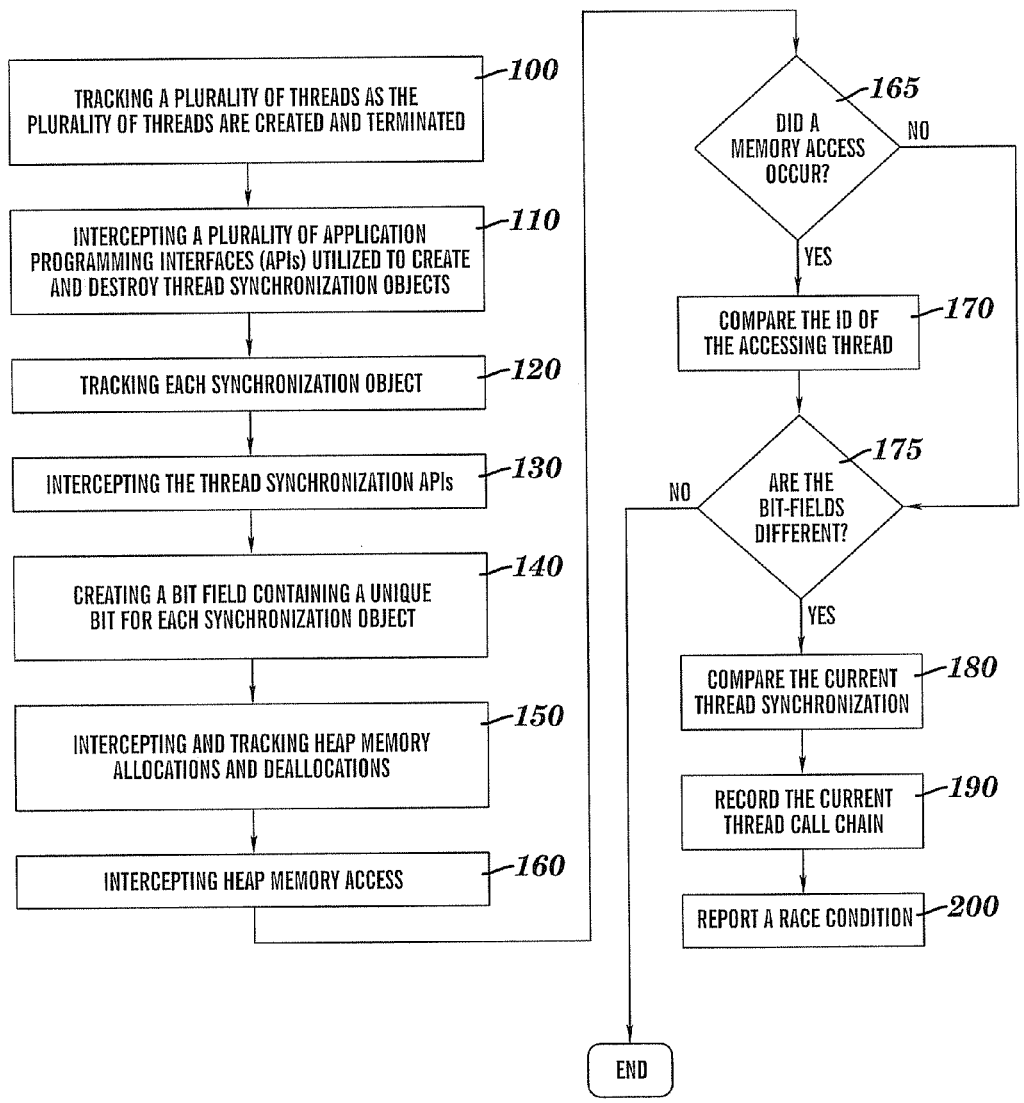
FIG. 1 illustrates one example of a method for detecting race conditions involving heap memory access.

Referring to FIG. 1, a low-overhead method for detecting race conditions involving heap memory access is shown. Starting at step 100, a plurality of threads are tracked as the threads are created and terminated, for example DllMain( ) is the starting routine in a thread that may be tracked as it is created and terminated.

At step 110, a plurality of application programming interfaces (APIs) utilized to create and destroy thread synchronization objects are intercepted, for example InitializeCriticalSection( ) and DeleteCriticalSection( ) are Windows® APIs utilized to create and destroy thread synchronization objects that may be wrapped. At runtime, the existing synchronization objects for the intercepted APIs are tracked in a list, and the list entry for each object is associated with a bit in a globally recognized bit field, in which there is one unique bit for each tracked synchronization object.

At step 120, each synchronization object that is created by way of these APIs is tracked. Then at step 130, the thread synchronization APIs are intercepted, such as EnterCriticalSection( ) and LeaveCriticalSection( ), which are Windows® thread synchronization APIs that may be intercepted. Furthermore, for the intercepted thread synchronization APIs, the synchronization objects held by each thread at any time frame are tracked. Also, a list entry for each thread holding the synchronization object is tracked. This tracking encompasses usage of a data structure T having fields T1 and T2, the field T1 is utilized to identify at least one of, (i) the thread ID, and (ii) the handle, the field T2 is utilized to identify an instance of the synchronization object bit field where a bit is set for each synchronization object currently owned by that thread.

At step 140, a bit field containing a unique bit for each synchronization object that is used or has been used during the process is created. Then at step 150, heap memory allocations and deallocations are intercepted. Furthermore, a list entry for each allocated heap memory block is tracked. This heap block tracking encompasses usage of a data structure B having the fields B1, B2 and B3. The field B1 is utilized to identify at least one of, (i) a thread ID, (ii) a handle, and (iii) a tracking structure, for example, B1 may be initialized to the tracking structure T representing the thread that allocated that memory block. The field B2 is utilized to identify a thread synchronization object bit field, which may be initialized to a copy of the allocating thread's synchronization object bit field at the moment of the block's allocation. The field B3 is utilized to identify a flag for indicating at least one of, (i) whether the block was last read, and (ii) whether the block was last written. The flag is initialized to read in order to prevent invalid reporting if a different thread initializes the block's contents.

At step 160, the heap memory access is intercepted for reads and writes. At step 165, it is determined if a memory access has occurred. When a memory access occurs, the ID of the accessing thread is compared with the last thread ID associated with that memory block when the last thread was last accessed in step 170. This comparison takes place when at least one of the following occurs: (i) the thread IDs do not match, and (ii) if the block is presently being written, and (iii) if at the last access time the block was written.

At step 175, the determination of whether the bit fields are different takes place. If the bit fields are different, the current thread synchronization object bit field is compared with the last synchronization object bit field associated with that memory block, at step 180.

At step 190, the current thread call chain is recorded if there are not bits in common. Then at step 200, a race condition warning that is displayable to the user with the call chain is reported.

Afterwards, field B2 of the tracking structure for the memory block is updated. Then the current thread bit field (T2) is copied to the bit field location for that block (B2). Subsequently, field B1 of the block tracking structure is updated.

A pointer is stored to one of the following: (i) the current thread ID, and (ii) the tracking structure (T1) referenced by the block tracking structure (B1). Then field B3 of the block tracking structure is updated.

The block is indicated as either one of, (i) read, and (ii) written. Afterwards a filtering mechanism is provided for race condition warnings with a filter per call chain, such that the user may hide particular outputs.

The disclosed invention may be utilized to detect race conditions involving non-heap objects, such as virtual memory pages. The invention may be extended to detect race conditions involving pages of memory-mapped data and stack memory by discovering and tracking all committed pages of memory periodically by walking through the virtual address space. For example, on Windows® this could be done by making a series of VirtualQuery( ) calls. For each page of committed memory, the method could track a structure similar to the memory block tracking structure previously described in this disclosure. In this structure fields P1, P2 and P3 are utilized. Field P1 represents at least one of, (i) a thread ID, (ii) a handle, and (iii) a thread tracking structure (T). For example, the thread tracking structure (T) previously described may be initialized to the tracking structure representing the first thread found to access that page. Field P2 represents a thread synchronization object but field, which may be initialized to a copy of the accessing thread's synchronization object bit field at the moment the page was first accessed. Field P3 is utilized as a flag for indicating whether the block was last read or written (initialized to the type of access performed by that thread). Last but not least, the memory-mapped and stack memory access (reads and writes) are intercepted, and as previously described the race condition warnings are reported.

Referring to FIGS. 2-7, a set of functions that may be utilized together, in an exemplary embodiment of the method disclosed in FIG. 1 are shown. One skilled in the art should know that the functions described herein may be implemented within a software runtime analysis tool in which a software application is instrumented and run. In the exemplary embodiment, for example, the various functions described herein may be implemented as part of a tool that analyzes a software program under test.

Figure 2:
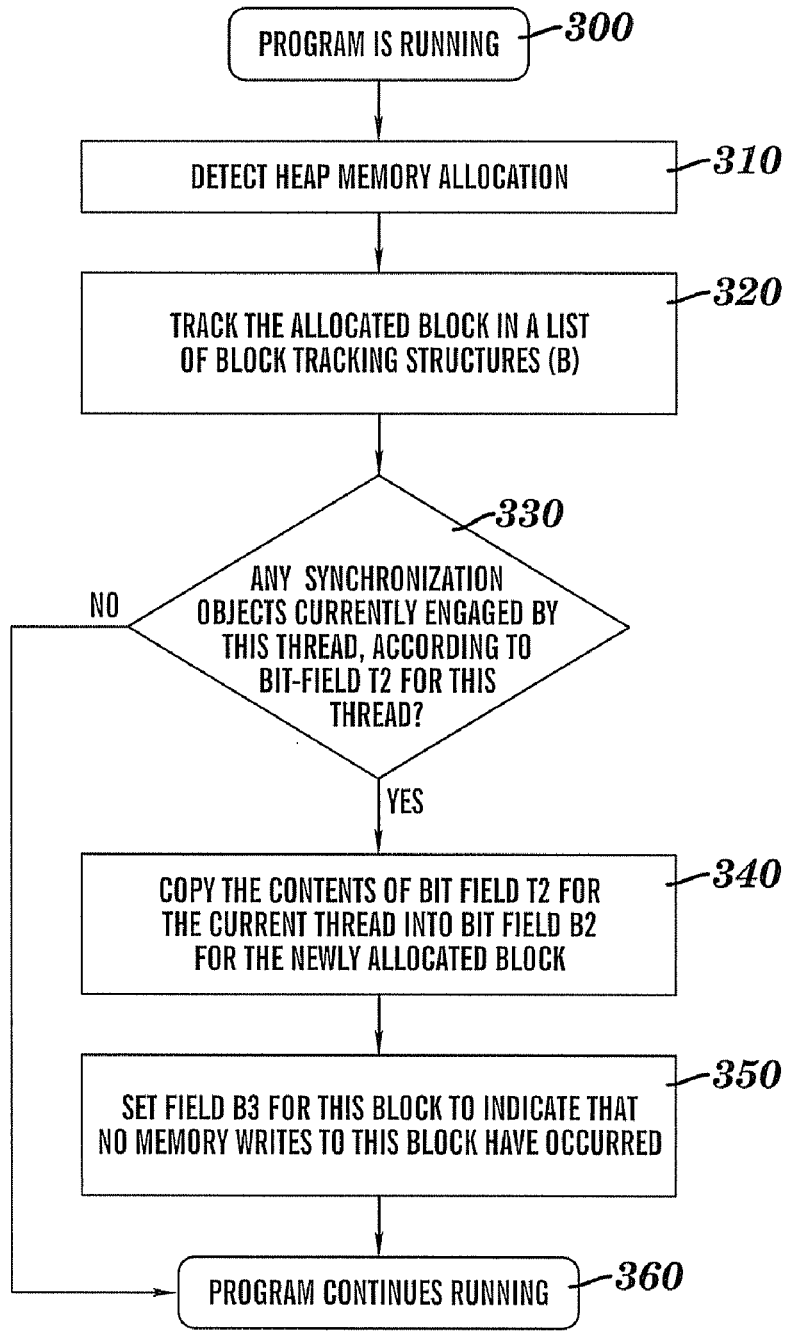
FIGS. 2-7 illustrate various examples of functions that may be executed as elements of an exemplary embodiment of the method disclosed in FIG. 1.

Referring to FIG. 2, at step 300, the program under test is running. Then at step 310, the heap memory allocation is detected via a hook that has been inserted during the instrumentation phase prior to the run. Subsequently, at step 320, the allocated block in a list of block tracking structures (B) is tracked. At step 330, verification for any synchronization objects currently engaged by the thread according to bit field T2 for the thread takes place. Provided there is a synchronization object currently engaged by the thread, the contents of bit field T2 for the current thread are copied into bit field B2 for the newly allocated block, at step 340. At step 350, field B3 is set for this block to indicate that no memory writes to this block have occurred. Control is returned to the program under test, which continues to run (operate) at step 360.

Figure 3:
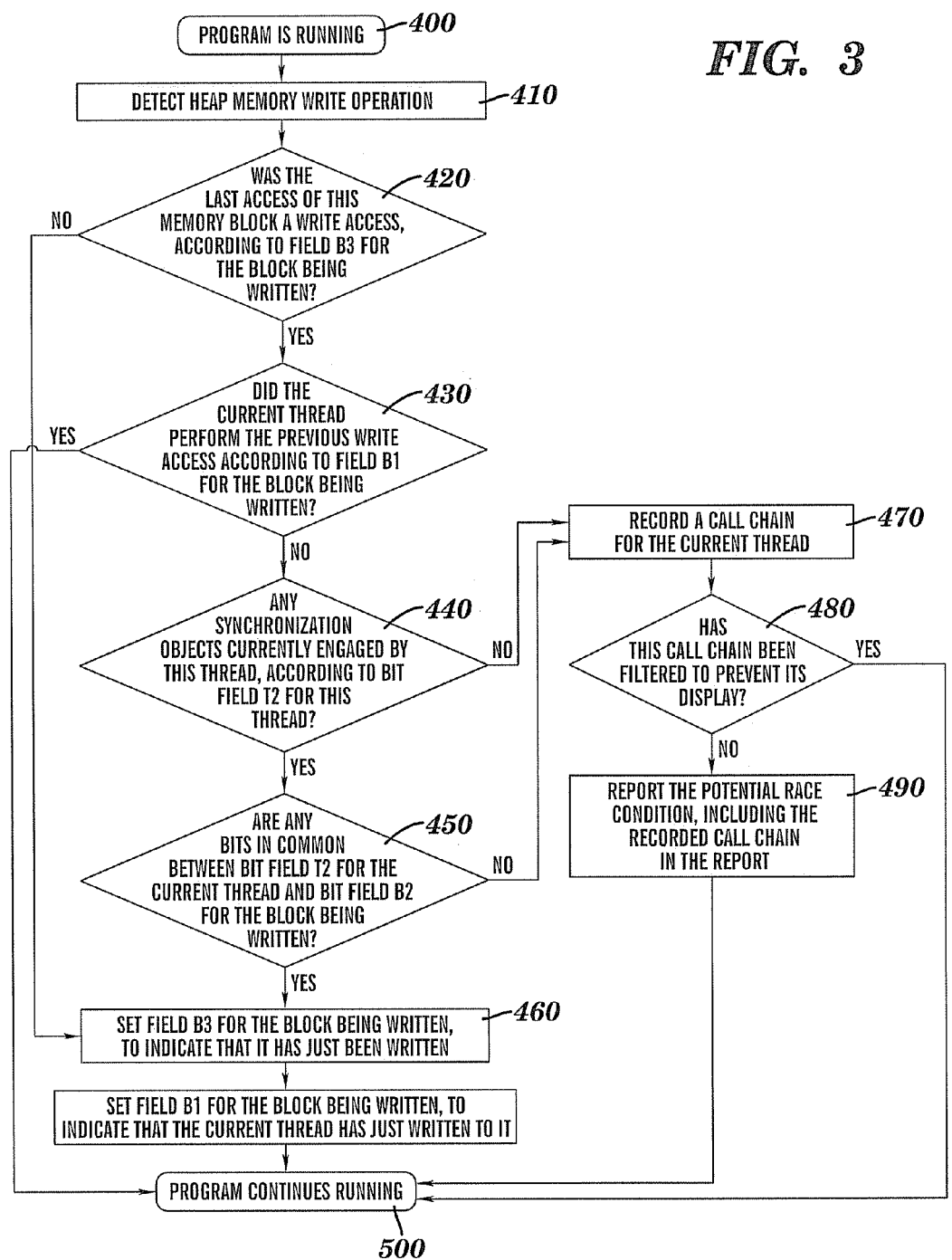

Referring to FIG. 3, at step 400, the program under test is running. Then at step 410, the heap memory write operation is detected via a hook that has been inserted during the instrumentation phase prior to the run. Subsequently, at step 420, verification that the last access of this memory block was a write access, according to field B3 for the block being written, takes place. At step 430, verification that the current thread performed the previous write access, according to field B1 for the block being written takes place. At step 440, verification that any synchronization objects currently engaged by this thread, according to bit field T2 for this thread takes place. Then at step 450, verification of bits in common between bit field T2 for the current thread and bit field B2 for the block being written takes place. At step 460, field B3 is set for the block being written to indicate that the current thread has written to it. At step 470, a call chain for the current thread is recorded provided no synchronization objects were currently engaged by this thread, and provided that no bits are in common between bit field T2 and bit field B2. Then, at step 480, verification that the call chain has not been filtered to prevent a potential race condition display takes place. At step 490, the potential race condition including the recorded call chain is reported. Control is returned to the program under test, which continues to run as noted by step 500.

Figure 4:
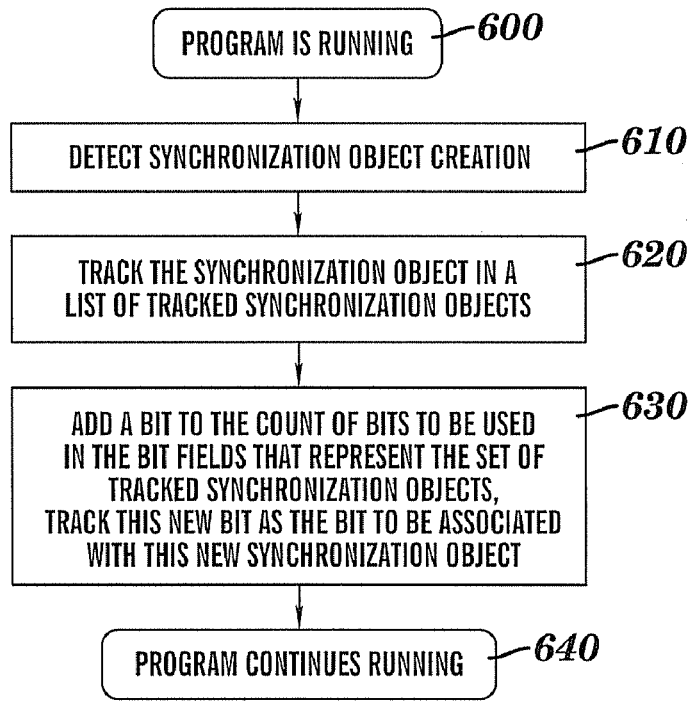

Referring to FIG. 4, the program under test is running at step 600. At step 610, synchronization object creation is detected via a wrapper for a thread synchronization object creation API. Subsequently, at step 620, the synchronization object is tracked in a list of tracked synchronization objects. At step 630, a bit is added to the count of bits that shall be used in the bit fields that represent the set of tracked synchronization objects, and this new bit is tracked as the bit to be associated with this new synchronization object. Control is returned to the program under test, which continues to run at step 640.

Figure 5:
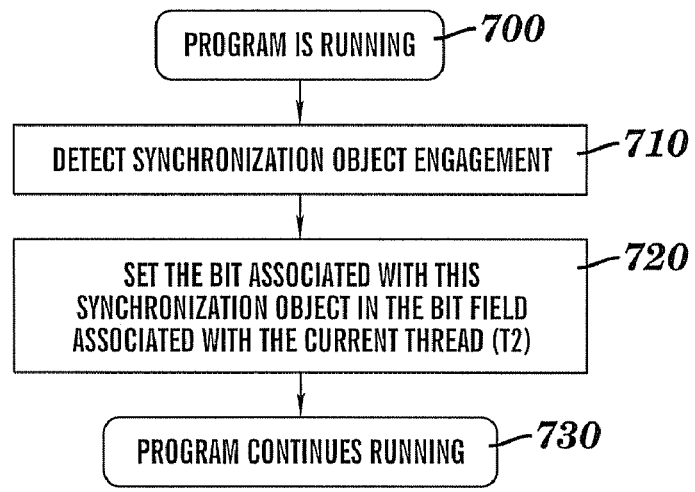

Referring to FIG. 5, the program under test is running at step 700. At step 710, the synchronization object engagement is detected via a wrapper for a thread synchronization API. Then at step 720, the bit associated with this synchronization object, in the bit field associated with the current thread (T2), is set. The program continues to run at step 730.

Figure 6:
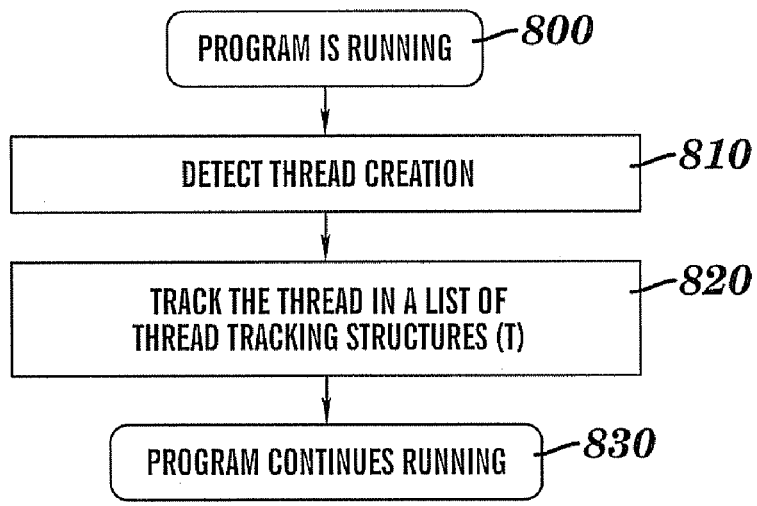

Referring to FIG. 6, the program under test runs at step 800. At step 810, thread creation is detected via a hook that has been inserted during the instrumentation phase prior to the run. At runtime, at step 820, the thread is tracked in a list of thread tracking structures (T). At step 830, the program continues to run.

Figure 7:
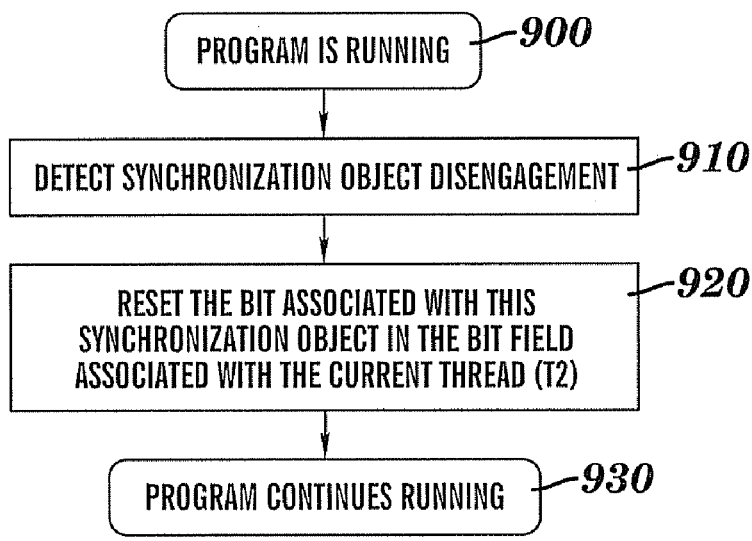

Referring to FIG. 7, the program under test is running at step 900. Then at step 910, synchronization object disengagement is detected via a wrapper for a thread synchronization API. At step 920, the bit associated with this synchronization object in the bit field associated with the current thread (T2), is reset. At step 930, the program continues to run.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for detecting race conditions involving heap memory access, comprising:
    tracking a plurality of threads as the plurality of threads are created and terminated;
    intercepting a plurality of application programming interfaces (APIs) utilized to create and destroy thread synchronization objects;
    tracking each of the thread synchronization objects that is created via the plurality of APIs;
    intercepting a plurality of thread synchronization APIs;
    creating a bit field that contains a unique bit for each of the tracked thread synchronization objects that is at least one of, (i) used, and (ii) has been used;
    intercepting and tracking heap memory allocations and deallocations;
    intercepting heap memory access;
    comparing an ID of a currently accessing thread accessing a memory block with a last thread ID associated with a last thread to access the memory block, the comparing occurring when the memory block is presently being written to or if at the last access time the memory block was written to;
    comparing a bit field of a thread synchronization object held by the current accessing thread with a bit field of a last thread synchronization held by the last thread associated with the memory block;
    recording the current thread call chain if there are no bits in common; and
    reporting a race condition warning that is displayable to a user having the call chain associated with a current access by the currently accessing thread and a previous accesses by the last thread to the memory block.

2. The method of claim 1, further comprising wrapping a plurality of the thread synchronization APIs including:
    tracking for the intercepted APIs the existing thread synchronization objects in a list and associating a list entry for each object with a bit located in a global bit field.

3. The method of claim 2, wherein wrapping the thread synchronization APIs further includes:
    tracking for the wrapped thread synchronization APIs the thread synchronization objects held by each thread at any time frame.

4. The method of claim 3, wherein tracking the thread synchronization objects further includes:
    tracking a list entry for each thread holding the thread synchronization objects.

5. The method of claim 4, wherein tracking a list entry encompasses usage of a structure having fields T1 and T2, the field T1 is utilized to identify at least one of, (i) the thread ID, and (ii) a handle, the field T2 is utilized to identify an instance of the thread synchronization object bit field where a bit is set for each object currently owned by that thread.

6. The method of claim 5, wherein intercepting and tracking heap memory allocations and deallocations further includes:
    tracking a list entry for each allocated memory block.

7. The method of claim 6, wherein tracking the list entry for each allocated memory block encompasses usage of a structure having field Bl, B2 and B3, the field B1 is utilized to identify at least one of, (i) the thread ID, (ii) the handle, and (iii) a tracking structure, the field B2 is utilized to identify a thread synchronization object bit field, and the field B3 is utilized to identify a flag for indicating at least one of, (i) whether the memory block was last read, and (ii) whether the memory block was last written.

8. The method of claim 7, further including:
    updating field B2 of the tracking structure for the memory block.

9. The method of claim 8, further including:
    copying the current thread bit-field (T2) to the bit field location for that memory block (B2).

10. The method of claim 9, further including:
    updating field B1 of the tracking structure.

11. The method of claim 10, further including:
storing a pointer to one of the following, (i) the current thread ID, and (ii) the tracking structure (T1) in the tracking structure (B1).

12. The method of claim 11, further including:
updating field B3 of the tracking structure.

13. The method of claim 12, further including:
indicating whether the memory block has been at least one of, (i) read, and (ii) written.

14. The method of claim 13, further including:
providing a filtering mechanism for race condition warnings with a filter per call chain, such that the user may conceal particular outputs.

15. The method of claim 14, wherein the bit field associates a set of thread synchronization objects with a given activity.

* * * * *